United States Patent [19]
Harrison et al.

[11] Patent Number: 5,898,462
[45] Date of Patent: Apr. 27, 1999

[54] METHODS OF PRODUCING DATA STORAGE DEVICES FOR APPLIANCES WHICH CAN BE USED TO COACH USERS IN THE PERFORMANCE OF USER-SELECTED TASKS

[75] Inventors: Robert G. Harrison; Robert D. Lamson, both of Seattle, Wash.

[73] Assignee: Coach Master International Corporation, Seattle, Wash.

[21] Appl. No.: 08/625,719

[22] Filed: Mar. 29, 1996

Related U.S. Application Data

[63] Continuation-in-part of application No. 08/569,310, Dec. 8, 1995.

[51] Int. Cl.[6] .................................................... H04N 7/00
[52] U.S. Cl. ........................ 348/552; 348/553; 348/838; 434/118; 434/307 R
[58] Field of Search ................................... 348/552, 553, 348/706, 836, 838, 839, 554, 61, 725, 734; 434/118, 307 R; 386/125; 345/155, 352, 353, 354, 356, 357

[56] References Cited

U.S. PATENT DOCUMENTS

| | | | |
|---|---|---|---|
| 4,855,842 | 8/1989 | Hayes et al. | 348/552 |
| 5,351,132 | 9/1994 | Sawabe et al. | 386/125 |
| 5,388,993 | 2/1995 | McKiel et al. | 434/118 |
| 5,448,371 | 9/1995 | Choi | 386/125 |
| 5,475,835 | 12/1995 | Hickey | 395/600 |
| 5,491,560 | 2/1996 | Sugawara et al. | 386/125 |
| 5,513,991 | 5/1996 | Reynolds et al. | 434/307 R |
| 5,535,422 | 7/1996 | Chiang et al. | 395/155 |
| 5,552,896 | 9/1996 | Yoshida | 386/125 |

*Primary Examiner*—Victor R. Kostak
*Attorney, Agent, or Firm*—Hughes, Multer & Schacht, PS

[57] ABSTRACT

Encoded data storage devices with stored data corresponding to: (a) information for coaching a user in accomplishing one or more steps of a specified task in a learn-then-perform way, and (b) an instruction set which enables the user access to access the information on a user-selected step of the task. Methods of providing and employing encoded data storage devices of the character just described.

12 Claims, 10 Drawing Sheets

TO FIG. 9B

METHODS OF PRODUCING DATA STORAGE DEVICES FOR APPLIANCES WHICH CAN BE USED TO COACH USERS IN THE PERFORMANCE OF USER-SELECTED TASKS

REFERENCE TO ANOTHER APPLICATION

The present application is a continuation-in-part of application Ser. No. 08/569,310 entitled INFORMATION AND ENTERTAINMENT CENTER and filed Dec. 8, 1995.

TECHNICAL FIELD OF THE INVENTION

In one aspect, the present invention relates to data storage devices for appliances which are used to coach users in the performance of user-selected tasks and to the operation of these appliances.

In a second and especially important aspect, the present invention relates to the provision of encoded data storage devices as characterized in the preceding paragraph which provide information in a learn-while-doing fashion; i.e., in a way which places emphasis on a user of the appliance first being coached on, and then performing, those steps of a task on which information is wanted.

In a third aspect, the present invention relates to methods of producing data storage devices as characterized in the preceding paragraphs which have: (a) task-related information retrievable and displayable in textual, graphic, textual-graphic and/or video form with, if desired, an audio accompaniment; and (b) instructions for controlling the retrieval and display of the stored information.

BACKGROUND OF THE INVENTION

U.S. Pat. No. application Ser. No. 08/569,310 filed Dec. 8, 1995 discloses one of a class of new and novel appliances having a COACH mode of operation in which the user is coached through the performance of a user-selected task. Major elements of those appliances are: (a) a player for a laser readable data storage device such as a video compact disc, an audio compact disc, a laser disc, or one of the soon to be available digital video discs; (b) a CRT, flat screen, or other visual display device for information retrieved from the data storage device; and (c) an audio output device; e.g., a conventional loudspeaker. Video discs are preferred over audio discs because a visual/audio presentation of a subject (or even a visual presentation alone as in the case of an ingredients or parts list, for example) will typically be superior to sound alone in conveying information to the user.

Stored on the preferred video compact disc are an introductory video which coaches the user in the operation of the appliance; a hierarchy of user-retrievable, multiple choice menus; and, for each of the choices in a bottom level menu, a video demonstration or static display (text, graphics, or text-graphics) for coaching the user through a task or a step of a task.

The introductory video allows a new user to easily use the system to access selected information on the very first try without training or guidance from another person and without consulting written instructions. For many, the elimination of the need to refer to written instructions is of paramount importance as they consider any more than the most rudimentary written instructions distasteful, if not something to be avoided at all costs.

In its COACH mode of operation, the appliance disclosed in the '310 application defaults to the playing of the introductory instructional video. The user can recycle to the beginning of the video after it has finished playing or at any time while the video is playing. This is particularly advantageous to the new user who can thereby easily play the introductory video as many times as is perceived to be necessary to assimilate information which the video presents.

The user can skip at any point in the introductory video to the highest level menu in the menu hierarchy. Otherwise, the advance to the top level menu will automatically occur when the introductory video ends.

Once the highest level menu is reached, the user is coached through the menu hierarchy. Beginning with the top level menu, the user can select one of the menus available on each successively lower level and can make a choice of the items of information available from the lowest level menu in a particular hierarchy.

If the choice from the selected lowest level menu results in a video or audio clip being played, the user is automatically returned to the menu (lower level) from which the selection is made upon completion of the presentation.

If a static display of information is present on the integrated unit screen, that display will stay on the screen until taken off by the user. That returns the user to the menu from which the information was selected.

The user can also back up stepwise through the hierarchy of menus to the top level menu and from the latter to the introductory video.

If operation of the appliance in the COACH mode is interrupted, operation of the appliance will resume from the point of interruption when operation in the COACH mode is restored. The user is thereby relieved of the task of navigating through the introductory video and perhaps an entire hierarchy of menus to the point previously reached if he or she wishes to: (a) interrupt a search for, or the display of, information; and (b) then return to the search for or viewing of displayed information.

There are occasions on which a user may wish to review all or part of the introductory video or the top level menu in the hierarchy after having navigated part or all of the way through the hierarchy of menus. The user can return in one step to the beginning of the introductory video or the top level menu from any level of operation.

SUMMARY OF THE INVENTION

Disclosed here are certain new and novel prerecorded (or encoded) data storage devices for use in appliances of the character described above and methods for producing those devices. A prerecorded data storage device, in this context and for the purposes of the present invention, is a video compact disc or alternative permanent memory device which contains, in a digitized form retrievable by an appropriate disc player or other data retriever: (a) information for coaching one through the carrying out of tasks and/or the steps of tasks; and (b) control instructions which allow the user to reach and bring up a (typically) visual or visual-audio display of information by which the user is coached through a task at hand or a step of that task. Data, in this respect, is used herein to include both the stored digital code which represents the information available to the user and the stored digital code for the control instructions.

The initial step in the disc—producing process is to select the task—or more often multiple tasks—which the user of the appliance can obtain coaching on. Unless a task is extremely simple, it is divided into a set of logical steps arranged in an orderly sequence. The steps are self-contained; i.e., the user does not have to retrieve information on a preceding or subsequent step to be completely coached with respect to the step focussed on at any given time.

The next step is to select an appropriate information format for coaching a user on accomplishing each of the steps into which the task has been divided (or on the task itself if, for example, the task employs only a single step). Available formats include static textual, graphic, and graphic-textual displays and video presentations. In many, if not the majority of, cases the visual presentation will be accompanied by appropriate audio.

Typically in parallel with the two preceding steps, an instruction set for each task is generated. This instruction set enables the command options available to the user for each task—for example: display the next lower level menu, display the information available on a specific step of the task, return to the introductory video, etc.

Once the coaching information and the instruction sets are generated, the video data is compressed; and authoring software is employed to convert or translate the instruction set and coaching information to a format readable by the compact disc player or other data retriever. The thus formatted data is then written to the data storage device. If the storage device is a video compact disc as is presently preferred, a conventional CD writer will be employed for this step.

Prerecorded compact discs and other encoded storage devices embodying the principles of the present invention are unique in that they make a learn-while-doing way of performing a task available to a user of equipment employing the encoded data storage device. The present invention emphasizes a watch-then-perform approach to the accomplishment of each step in a task, and the instruction set is so constructed that the user can easily reach the information relating to the performance of a particular step, repeat the presentation of that information, advance sequentially through the steps of the task, skip steps, return directly to an introductory video or the first step of the task, and otherwise navigate through the available choices in a fashion which best meets his or her needs.

Prerecorded compact discs which allow a user to select visually displayable and visual-audible segments from the disc are available. These currently available discs are of quite different character from those disclosed herein. They do not have the capability of coaching one in the accomplishment of a task, let alone give one the ability to select only those steps of a task on which coaching is wanted, to repeat the presentation of information on a selected step, to advance through available steps in a user-customized manner, to return directly to an initial step or introductory video, or other navigate through available choices as he or she elects. Instead, all that is typically available is a generally lengthy video, much of which may be of no interest. To locate and view only a wanted part of such a video is cumbersome and time consuming, at best. Also, the information is typically not performance oriented. It does not coach one on how to carry out a task or steps of a task.

Furthermore, the instruction sets found on conventional discs do not have the versatility of those disclosed herein. For example, no provision is made for navigating through a hierarchy of menus, for one-step return to an introductory video or the top level menu in a menu hierarchy, for repeated viewing of coaching information presented in a video format, etc.

The objects, advantages, and features of the present invention will be apparent to the reader from the foregoing and the appended claims and as the ensuing detailed description and discussion of the invention proceeds in conjunction with the accompanying drawings.

DETAILED DESCRIPTION OF THE INVENTION

Figure 1:
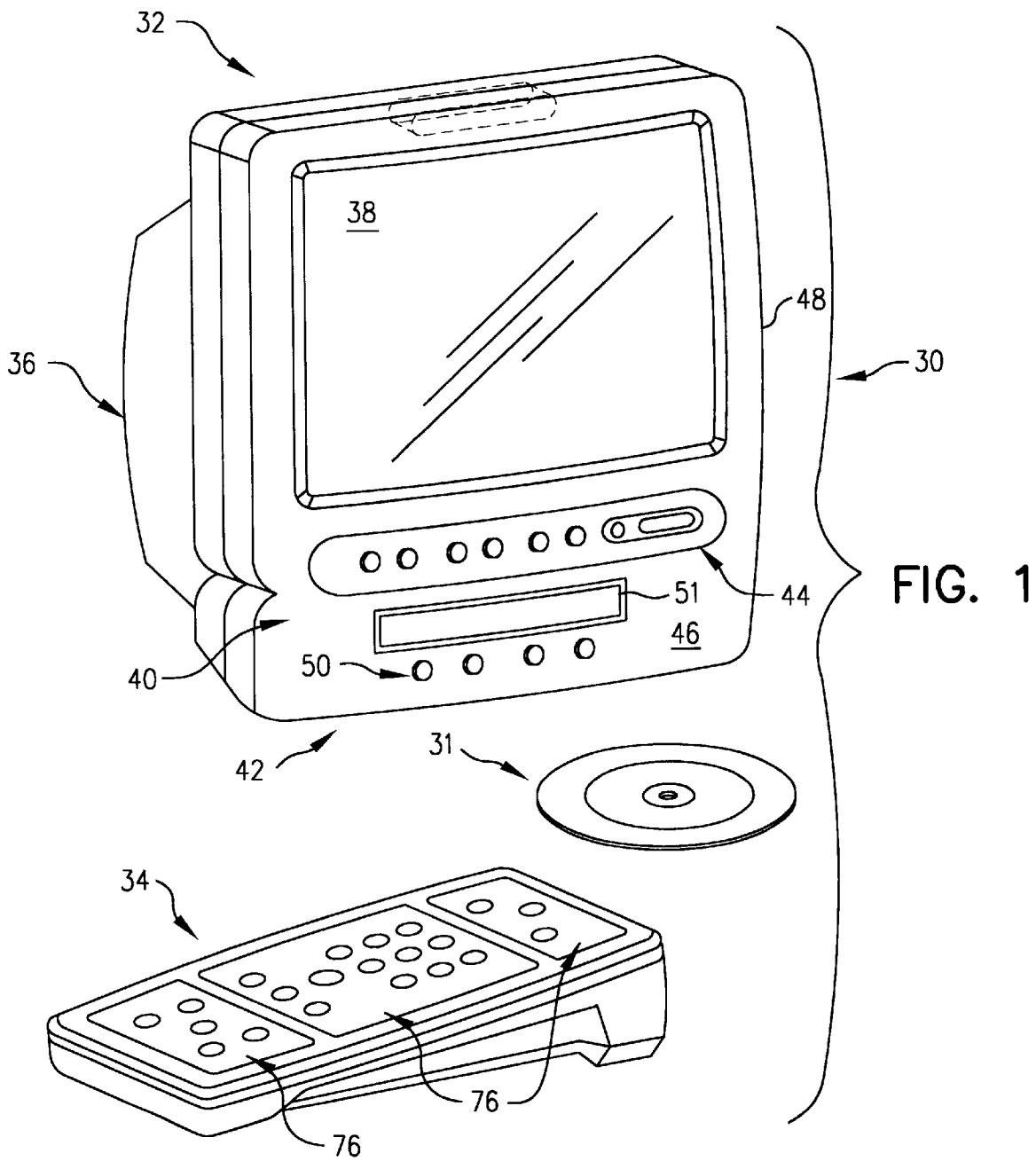
FIG. 1 depicts, pictorially, one representative system for retrieving and presenting, in visual or visual/audio form, information stored on a video compact disc or other data storage device in a format which, when retrieved and presented, coaches the system user in the performance of a user-selected task or a step employed in accomplishing the task.

Referring now to the drawing, FIG. 1 depicts an appliance or system 30 designed to retrieve information from a video compact disc 31 embodying, and storing data in accord with, the principles of the present invention. System 30 is so constructed that one can easily, and at any time, switch between: (a) watching television, and (b) a COACH mode of operation in which information stored on a video compact data storage disc 31 is retrieved and presented in visual or visual/audio form. The major components of system 30 are an integrated unit (or module) 32 and a remote control 34.

Integrated unit 32 includes a television set 36 with a screen 38 and a video compact disc player 40, both housed in the same cabinet 42. Conventional on-board controls 44 for television set 36 are located on the front panel 46 and one side panel 48 of cabinet 42, and on-board controls 50 for disc player 40 are also located on front cabinet panel 46. A conventional tray 51 is used to load a disc 31 into player 40.

Figure 2:
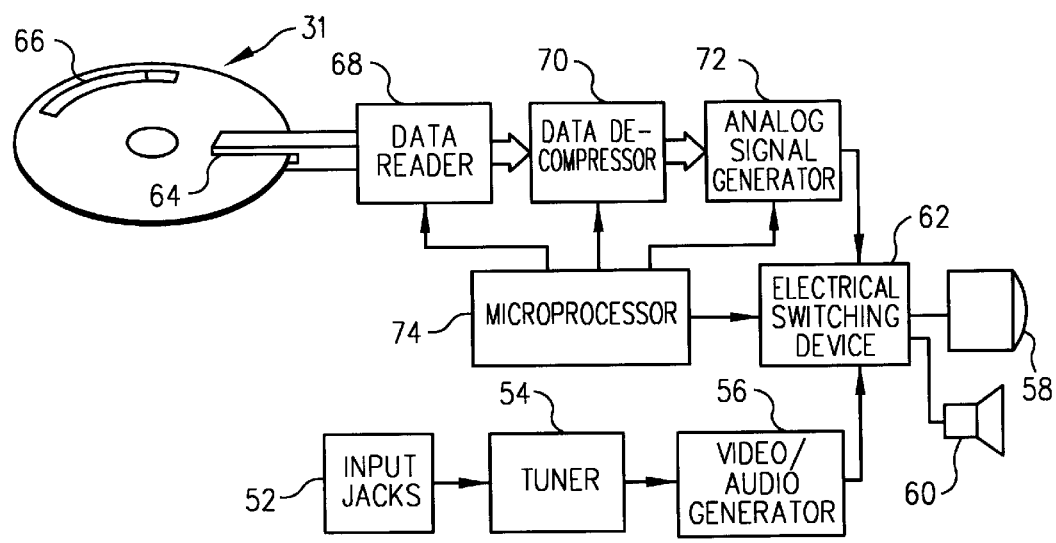
FIG. 2 shows, in schematic form, the operating system of an integrated unit which is also a component of the FIG. 1 system.

The internal, operating components of integrated unit 32 are depicted schematically in FIG. 2. These components include input jacks which are collectively identified by reference character 52 and are employed to connect integrated unit 32 to a television signal source—a television antenna or cable and/or a VCR. A tuner 54 is employed by the user to select one of the available television channels to watch or the VCR channel (usually 3 or 4) at the user's location. The (off-the-air or VCR) signal is directed to a video/audio generator 56 which transforms the incoming signal to a video signal convertible to visual images. The visual images are displayed on the CRT screen 38 of television set 36. The incoming signal also includes an audio component which is converted to audible sound by video/audio generator 56 and the illustrated loudspeaker 60. The video and audible signals are routed to CRT 58 and loudspeaker 60 through an electronic switching device 62 which allows a user to choose between television reception and the COACH mode of operation.

The television set 36 and video compact disc player 40 are powered up together so that integrated unit 32 is always available for use in the COACH mode when unit 32 is turned on.

Video compact disc player 40 has a conventional mechanism (not shown) for spinning the laser readable disc and an equally conventional laser pickup 64 for reading information stored in digital data files in the tracks 66 on discs 31 (only one of which is shown). The output from pickup 64 goes to a data reader 68, which outputs a stream of digitally compressed data (the form in which the data is stored on disc 31). The data reader is connected to a decompressor 70 for the data retrieved in the compressed format. After decompression, the data is routed to an analog signal generator 72 which converts the data to video and audio analog input signals utilizable by CRT 58 and loudspeaker 60 to generate visual images and audible sound. The operation of the data reader, the data decompressor, and the signal generator is controlled in a conventional manner by microprocessor 74.

Figure 1A:
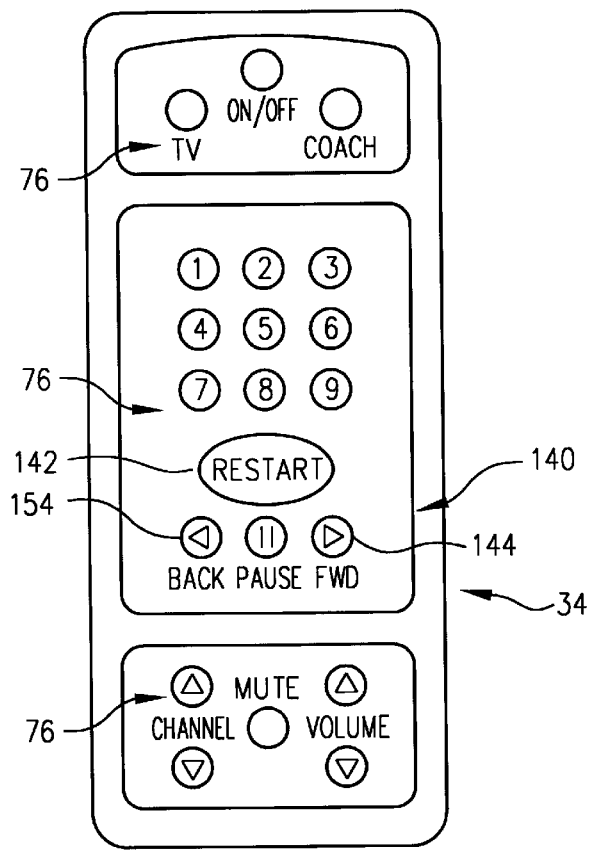
FIG. 1A is a plan view of a remote control, which is a component of the FIG. 1 system.

Referring now to FIG. 1A, remote control 34 includes a complement of controls—collectively identified by reference character 76—for operating integrated unit 32. These controls (or actuators) are preferably of the pushbutton type, with the actuation of each button causing remote control 34 to broadcast a distinctly coded operating signal to integrated unit 32.

Like those on the front and side panels 46 and 48 of integrated unit cabinet 42, the controls of remote control 34 are preferably color coded. Table 1 below identifies a representative set of controls, the colors assigned to the controls, the modulation frequency of the signal transmitted when each of the controls is pressed, and the function of each control.

TABLE 1

| Control | Color | Modulation Frequency | Function |
|---------|-------|---------------------|----------|
| ON/OFF | GREEN | 4100 Hz | Turns television set 36/video compact disk player 40 on and off |
| TV | GRAY | 4300 Hz | Places the television set 36 of integrated unit 32 and the remote unit controls in the television mode |
| COACH | GRAY | 4500 Hz | Plays an introductory video and switches the buttons on remote control 34 to their COACH mode functions so that a user can view the introductory video and/or |

TABLE 1-continued

| Control | Color | Modulation Frequency | Function |
|---------|-------|---------------------|----------|
| ①...⑨ | GRAY | 4700–6700 Hz | navigate through a hierarchy of menus to information on a subject of interest In the television mode-- select a television channel and/or the VCR channel; in the COACH mode -- select a correspondingly numbered option from a menu |
| RESTART | RED | 6900 Hz | Jumps to the introductory video or the top level menu in a hierarchy of menus |
| BACK | GRAY | 7100 Hz | Retreats to the previous step in a COACH mode sequence |
| PAUSE | GRAY | 7300 Hz | Freezes operation in the COACH mode until pressed again |
| FORWARD | GRAY | 7500 Hz | Advances to the next step in a COACH mode sequence of steps |
| CHANNEL+ | GRAY | 7700 Hz | Selects the next higher television channel |
| CHANNEL− | GRAY | 7900 Hz | Selects the next lower television channel |
| MUTE | GRAY | 8100 Hz | Turns the sound off until pushed again |

Figure 3:
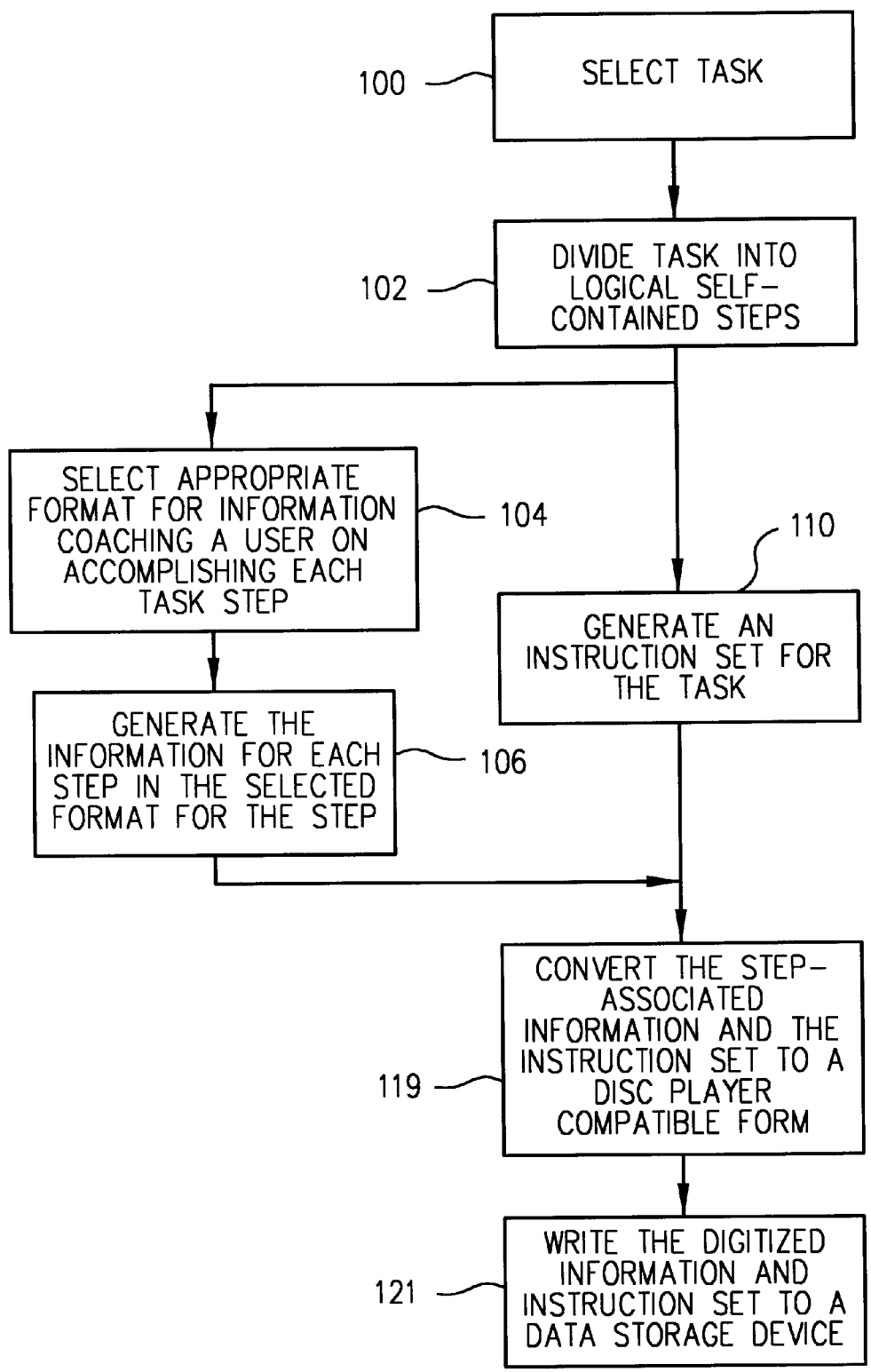
FIG. 3 depicts, in block diagram form, the steps of the novel process employed in making a prerecorded data storage device embodying the principles of the present invention.

Referring still the drawing, FIG. 3 shows in block diagram form the steps employed in producing a video compact disc which embodies the principles of the present invention and has stored thereon in digitized form data representing: (a) information for coaching a user of system or appliance 30 through a user-selected task or through user-selected ones of the steps involved in performing the task; and (b) an instruction set embodying the menu navigation and other options available to the system user.

Figure 9A:
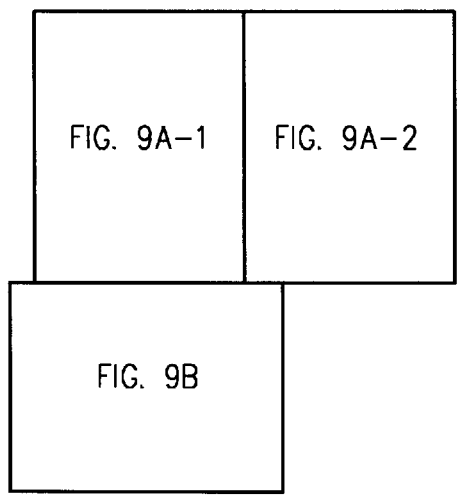
FIGS. 9A through 9B, taken together, constitute a representative data storage layout which embodies the principles of the present invention and which includes: (a) an introductory video, (b) a hierarchial array of user navigable menus, and (c) dynamic (video clip) and static (graphic-textual) presentations of information which can be reached by a user of the FIG. 1 appliance and employed to coach the user through the steps of a representative task depicted in the layout.
Figures 1, 9A:
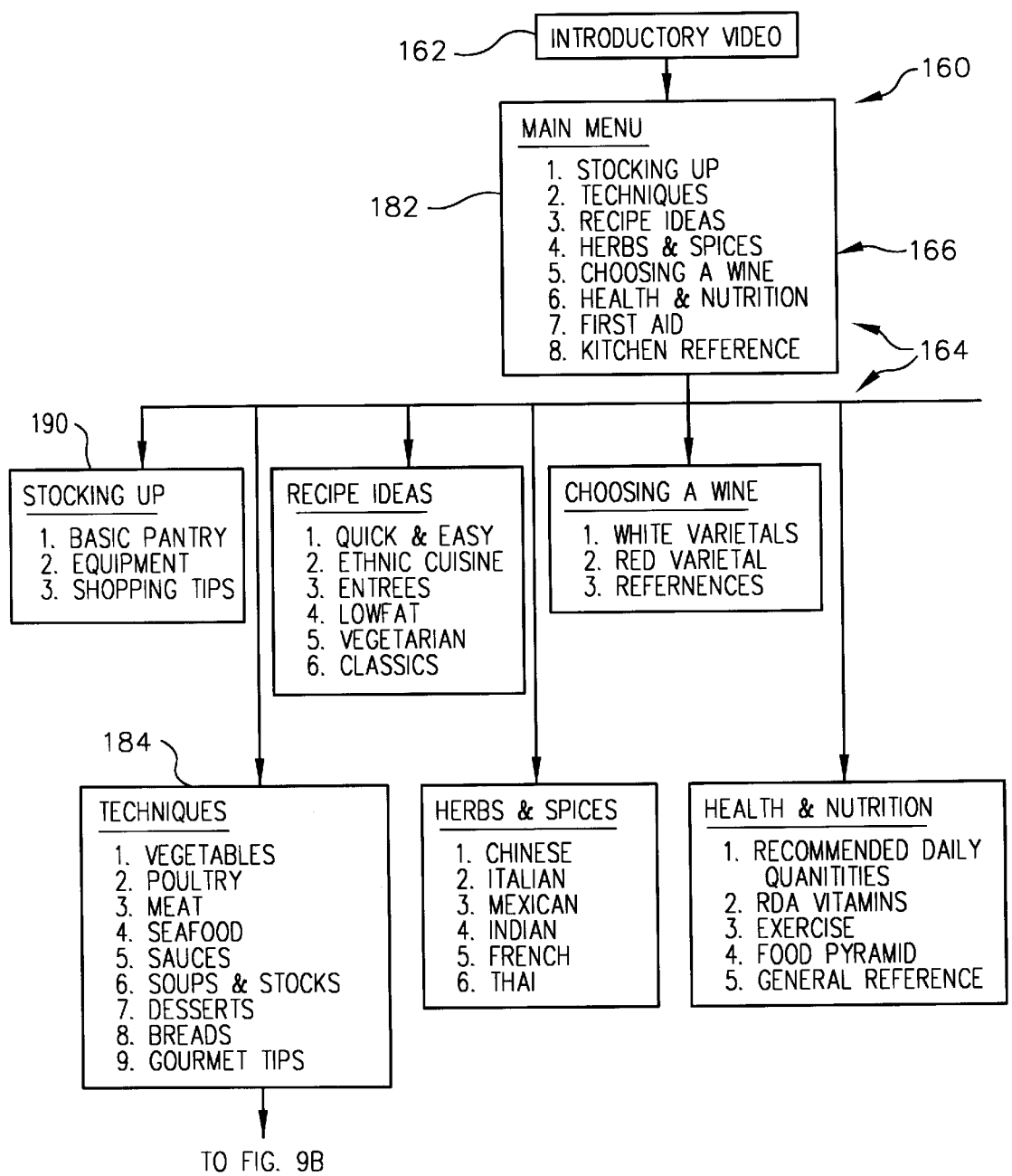
Figures 2, 9A:
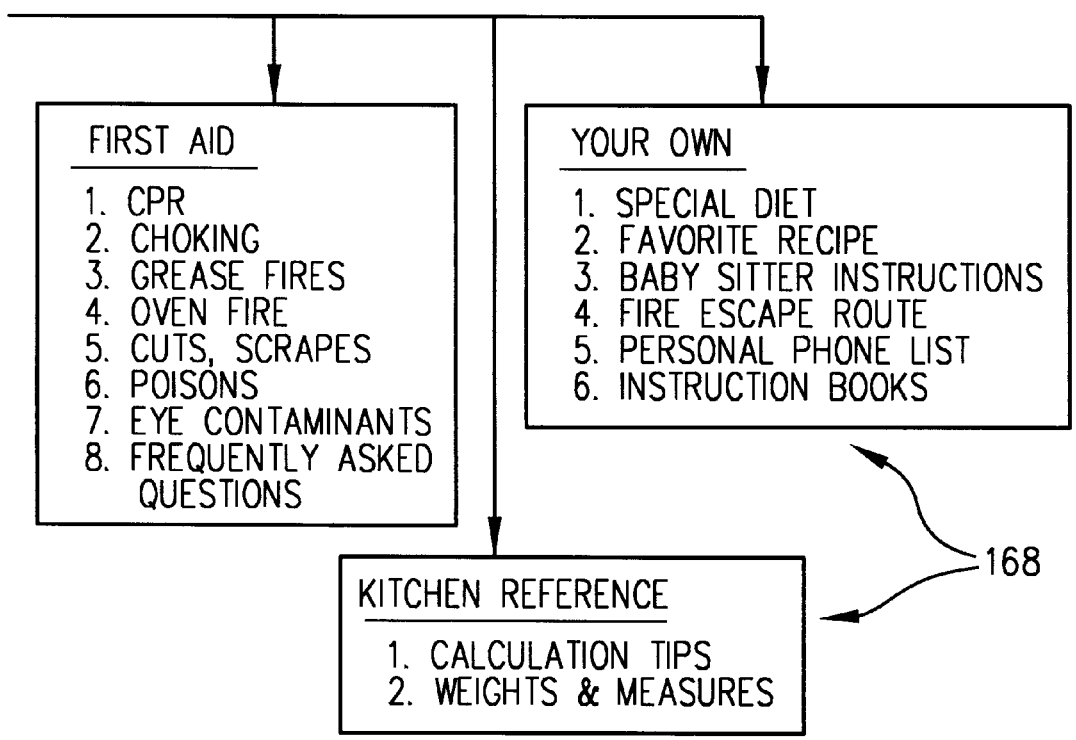
Figure 9B:
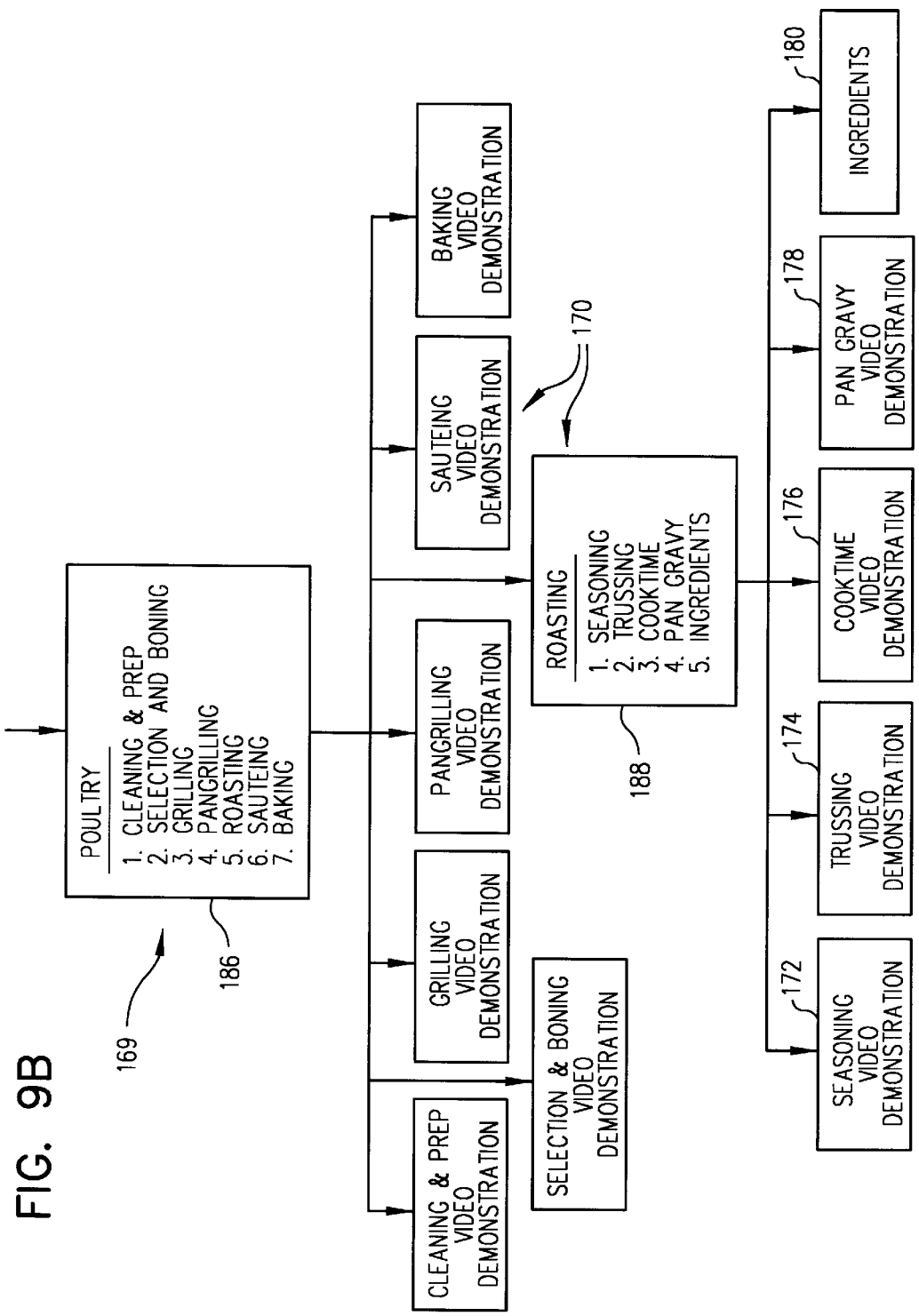

The initial step in the disc-producing process of the present invention, identified by reference character 100 in FIG. 3, is to select and label those tasks on which coaching information is to be made available from a video compact disc or other data storage device. For example, as shown in FIGS. 9A and 9B and as will be described in more detail below, the tasks selected for inclusion on a disc may all, as one example only, be associated with activities that may be undertaken by one working in a kitchen.

Once the tasks have been identified and labeled, each task—unless very simple—is divided into the steps which must be accomplished to complete the task as indicated by reference character 102 in FIG. 3. It is important, in this respect, that each step be self-contained and have a logical beginning and ending. For example, in a step describing the clapping of hands, one would begin with the hands apart; then being swung together into contact; and subsequently being swung apart to the initial, at rest position. One would not coach a person to clap hands by beginning with the hands in the middle of the inward swing; then being brought together; swung outwardly; and then swung inwardly to the starting, intermediate position. That "step" would not have a logical beginning or ending, and it would not be self-contained. One would have to refer to the presentation of information on at least one additional step to learn how to clap hands.

A third step 104 in the disc-producing process is to select the information format which can best be employed to coach one through each step of each selected task. Available options are static displays of textual and graphic information or combinations thereof and video presentations, any of which may be accompanied by an audio presentation. One of the tasks depicted in detail in FIG. 9B by way of example is the roasting of poultry, a task which is divided into four logical, self-contained steps. For a step such as TRUSSING (step 2), a video demonstration (video clip) or other dynamic presentation of how a bird is trussed is the most appropriate. For option 5 (INGREDIENTS), a static display of the ingredients which must be on hand for the task of roasting a bird is more appropriate. In other cases, still within the purview of the FIGS. 9A, 9B example, a graphic display may prove most helpful. An example might be a static graphic display showing the arrangement or presentation on a platter of the roasted bird with accompaniments and garnishes.

Step 104 is followed by step 106 in which the information for each step in the selected format is generated. Video clips are produced with a video recorder 108, typically a Betacam or other recorder capable of producing high quality video clips. It is important to control the lengths of the video clips. In many cases, clips less than 30 seconds in duration will not provide sufficient information to the system user to be optimally helpful unless a step on which the user is being coached is very simple. At the other end of the range, as the duration of the clip exceeds (typically) about eight minutes, the risk of flooding the user with more information than can be usefully assimilated rapidly escalates.

Statically displayed information in textual or graphical format or in graphical/textual form may be generated employing a conventional personal computer and a desktop publishing program such as Aldus PageMaker, for example. Typically, *.BMP files (reference character 109) are generated.

Usually, but not necessarily, while steps 104 and 106 are carried out, the instruction sets for the selected tasks are laid out as shown in FIGS. 5–8 (step 110).

Figure 4:
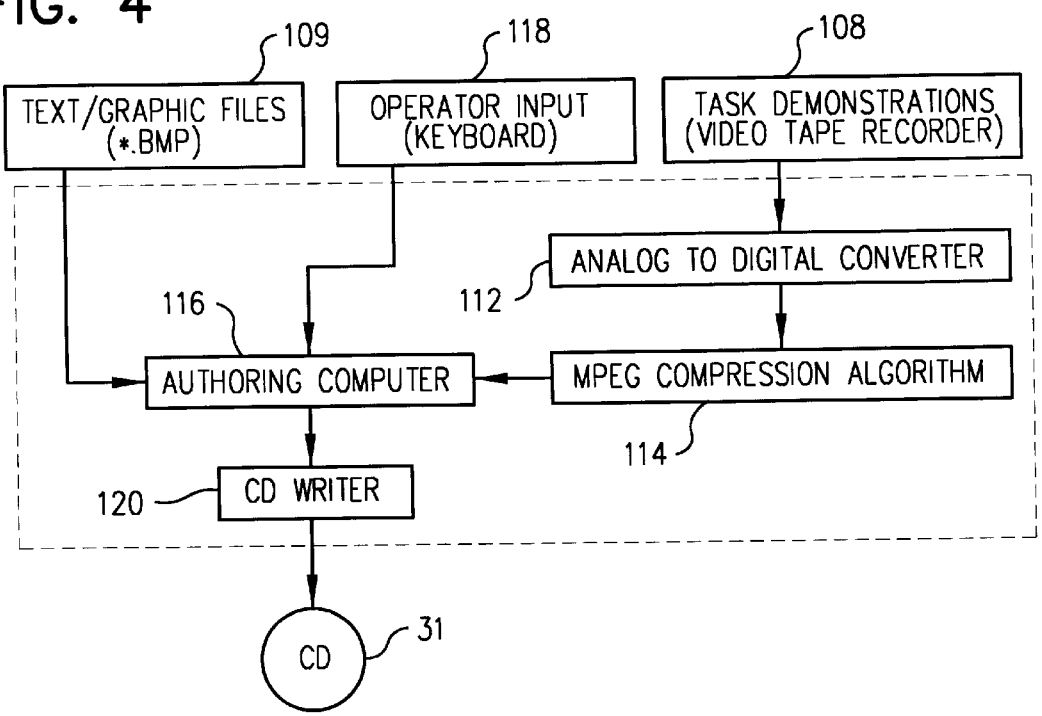
FIG. 4 is a block diagram showing how data representing information and instruction sets is compressed, translated to a retrievable format, and written to the data storage device.

Referring still to FIG. 3 but also to FIG. 4, the analog signal generated by video tape recorder 108 is digitized by an analog to digital (A/D) convertor 112; and the digital data is compressed as shown by reference character 114. Software which conforms to the MPEG (Motion Picture Expert Group) Standard can be used to compress the digitized video signal. The digitized data is fed to a personal computer 116 in which an authoring program has been loaded. The *.BMP files representing statically displayable presentations are inputted to computer 116 in that format. Control instructions such as NEXT, PREVIOUS, and RESTART as shown in FIGS. 5–8 and described in detail below are inputted to computer 116 from a keyboard 118 employing a PSD (program sequence descriptor).

The authoring software in computer 116 (for example, that supplied by Digital Video Systems) converts or translates the data inputted into the computer to a format which disc player 40 supports (step 119). The reformatted data is transferred to a conventional laser-based compact disc writer 120 which writes the data to video compact disc 31, typically by burning conventional pits into the tracks 66 of disc 31 (step 121).

Figure 5:
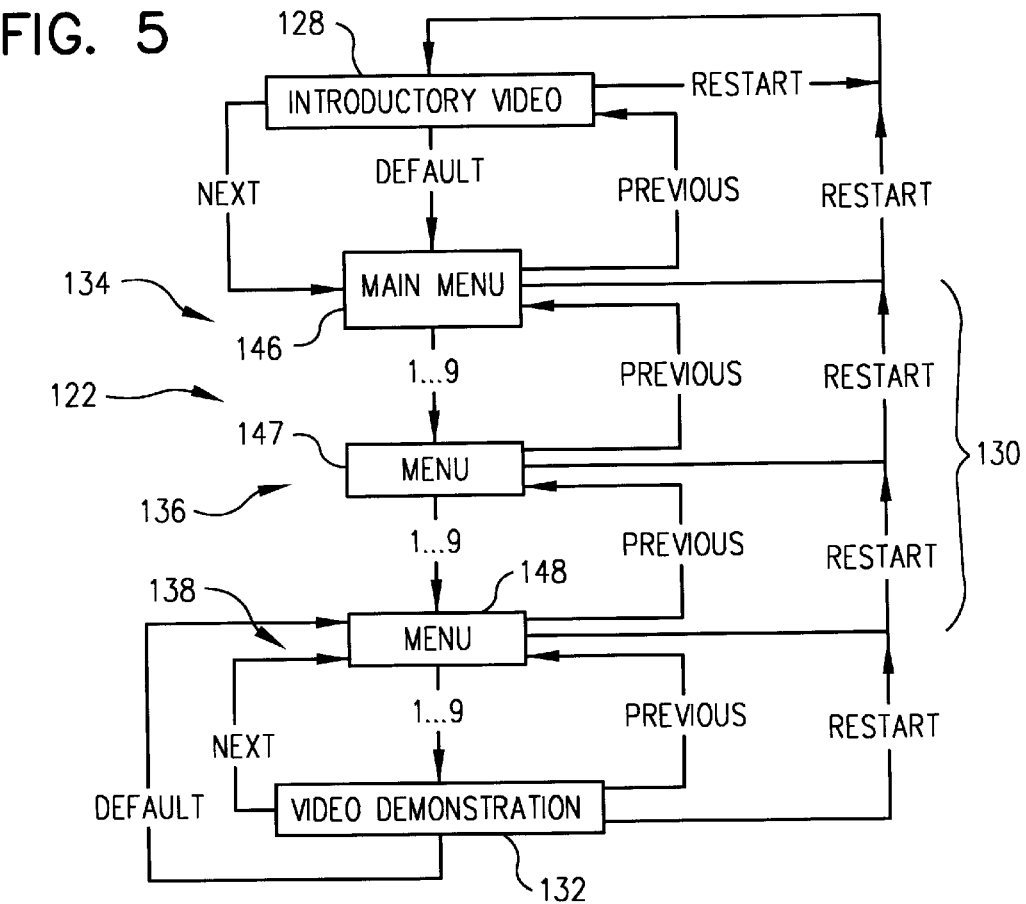
FIGS. 5–8 each show what is termed in above-cited application Ser. No. 08/569,310 a navigation chart; each navigation chart includes: (a) a structural representation of how retrievable information is organized, and (b) an associated control instruction set which allows a user to navigate through available options to reach pertinent information and to accomplish other objectives.

Referring still to the drawing, FIG. 5 depicts a representative navigational chart 122 constructed in accord with the principles of the present invention. It is the steps on that chart—NEXT, PREVIOUS, and RESTART—which can be employed by a user of appliance 30 to select a task, obtain coaching on the task or a particular step of the task, return to introductory video 128 or a higher level menu in the illustrated hierarchy 130, or repeat the playing of the demonstration video 132.

In the representative navigation chart 122 shown in FIG. 5, the introductory video 128, the hierarchy 130 of menus, and the video clip 132 are hierarchically related. Menu hierarchy 130 has three levels 134, 136, and 138 of menus; and the menus at each level may afford the system user up to nine choices. The hierarchal structure thus "fans out" from level-to-next lower level, giving the user up to 729 options on which coaching may be obtained if all menus at all levels provide the permitted maximum of nine choices as shown by the following table.

TABLE 2

| Menu Hierarchy Level | Number of Menus | Number of Choices |
|---|---|---|
| (Descending Order) | | |
| Top (134) | 1 | 9 |
| Second (136) | 9 | 81 |
| Third of Bottom (138) | 81 | 729 |

One or more of the choices at each level may be information—a static text, graphic, or text/graphic presentation or a video clip—instead of next lower level menu selections or a mixture of menu selections and informational choices. However, it may be desirable to avoid a mixed category to minimize confusion and promote ease of use.

It is emphasized that FIG. 5 and Table 2 are concerned only with a representative hierarchy of menus. There may be fewer—or more—than three levels in the hierarchy, and the hierarchy may be asymmetric. For example, at the second level 136 of hierarchy 130, one or more of the menus may be a bottom level menu offering only options for selecting information. Present at the same level may be one or more other menus offering choices leading to menus on the bottom (third) menu level 138.

The choices available at each level are preferably limited to nine; and these choices are numbered so that, at every level, a choice can be made by pressing a single, correspondingly numbered one of the buttons ①  through ⑨ in remote control numerical keypad 140 (see FIG. 1A). This unique feature is another one which makes system 30 easy and convenient to use and therefore acceptable to a person without technical training or inclination and with only the instruction provided by introductory video 128.

Once the introductory video 128 has been played, the user has two options. One is to press the dedicated RESTART button 142 of remote control 34. This causes the introductory video to be replayed. The second option is to press the also dedicated FORWARD (FWD) or NEXT button 144. This results in the single main menu 146 of top or first menu level 134 being displayed on screen 38. That menu has up to nine choices as discussed above.

Selecting one of the main menu options may lead the user of system 30 to a second level 136 menu such as the illustrated menu 147 or to a static or dynamic display of information on screen 38.

If a second level 136 menu is reached by pressing a button ① . . . ⑨ on keypad 140, the user of system 30 has the option of again pressing a keypad button ① . . . ⑨ to bring up on screen 38 a third level 138 menu such as the illustrated menu 148. Selecting an option from a third level menu: (a) brings to screen 38 a static or dynamic display of information which coaches the user of system 30 through a task, or more probably most often, one self-contained step of a task.

In many instances, a static display of information on the selected task or step is too voluminous to fit on screen 38.

In this case, the legend MORE appears at the bottom of the screen. When that happens, the user can proceed by pressing remote control FWD button 144. This brings up on screen 38 a second page continuing the presentation initiated by the first-displayed page of information.

This use of FWD button 144 can be continued until a page with the legend END OF TEXT appears. END OF TEXT indicates that all of the information on the task or step selected by the system user has been retrieved from disc 31 and displayed on screen 38.

The instruction set may be coded so that a video clip selected from a menu such as 148 will be automatically replayed until the user of system 30: (1) presses remote control RESTART button 142 to return to introductory video 128 or a top level menu such as 146, or (2) presses a dedicated remote control button 154 labelled BACK or PREVIOUS to back up one step to a second level 136 menu. This automatic recycle feature is important because the system user is repeatedly given the appropriate information without any action on the user's part. In situations requiring the application of first aid, as one example, this is a decided advantage to one preoccupied with treating a victim in need of immediate attention.

As indicated in FIG. 5, the system user can return at any point, be it from a menu or a display of information, and in a single step, to the introductory video 128. This is done by pressing remote control unit RESTART button 142. This ability to jump back to the introductory video by pressing only one button allows the system user to at any time easily and immediately rerun part or all of the introductory video if he or she perceives the need for a refreshed recollection of what is available or how to proceed in order to reach information on a step of interest.

Equally important, the system user can back up one step in the step-by-step information accessing process by pressing a dedicated remote control button 154 labelled BACK or PREVIOUS. This enables the system user, by pressing a single button, to: (a) back up from one page of a static display to the preceding page; (b) back up from a display of information to the menu from which the information was selected; (c) return from a currently displayed menu to a menu in the next higher level of hierarchy 130; and (d) return from main menu 146 in the top level 134 of hierarchy 130 to introductory video 128.

Figure 6:
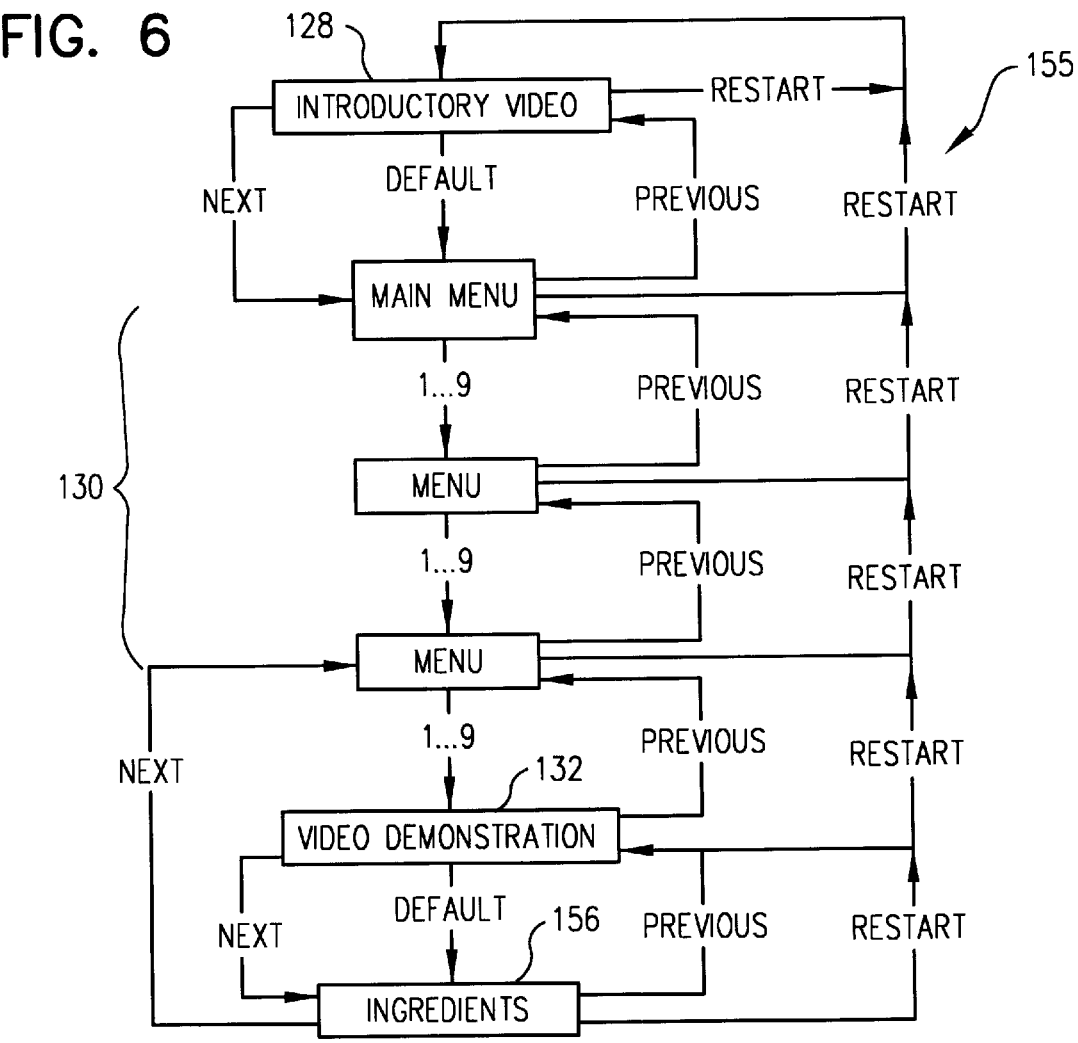
Figure 7:
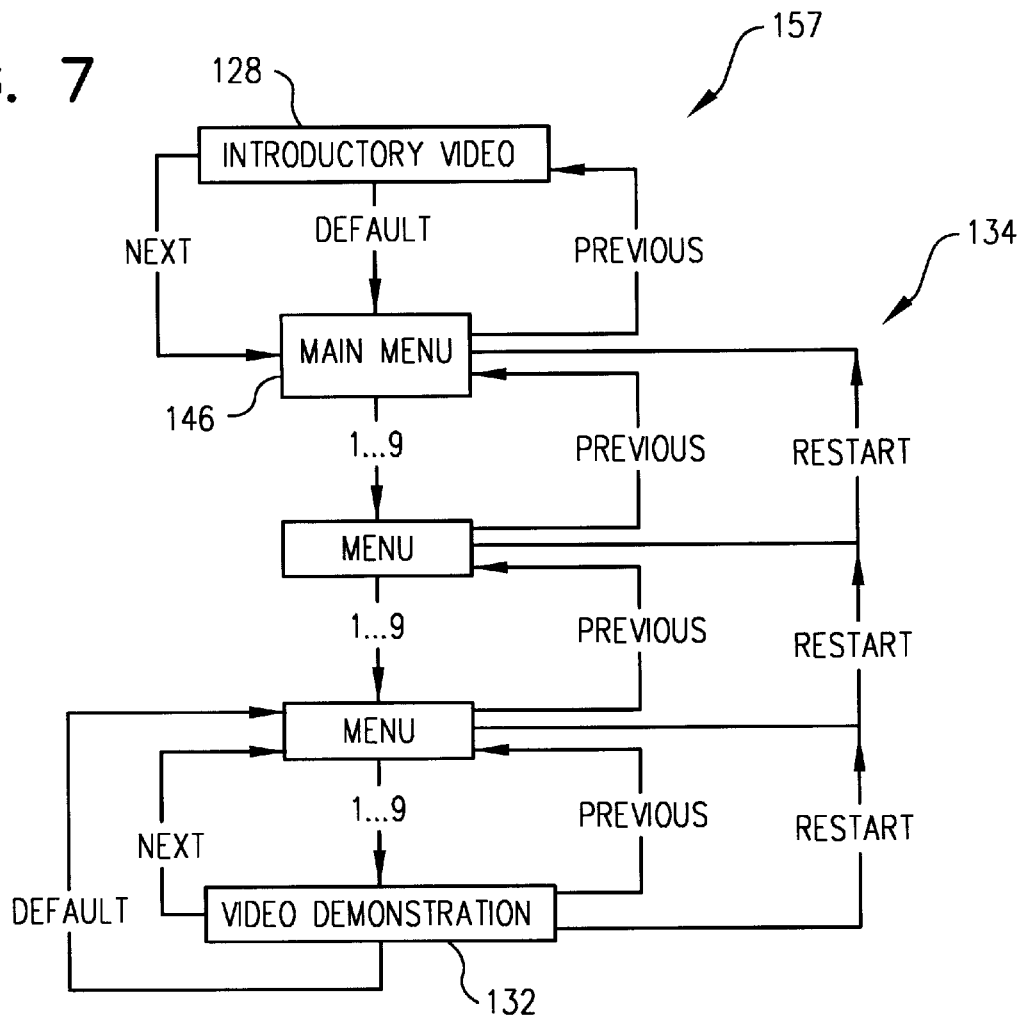
Figure 8:
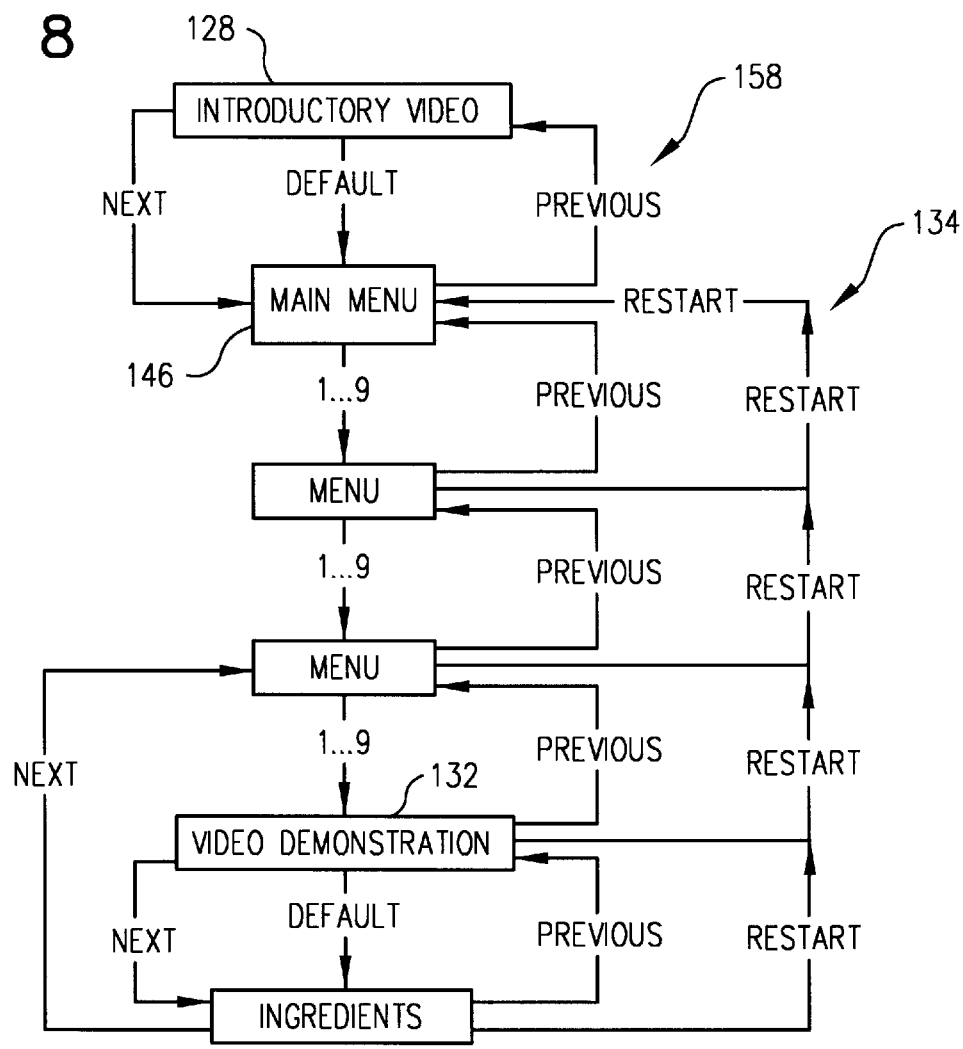

The navigation chart 155 depicted in FIG. 6 differs from navigation chart 122 in that there is an automatic default from the display of a video demonstration or clip 132 to a graphic display 156 when the video clip ends. One representative instance in which this can be employed to advantage is in the preparation of food. The video clip being watched is in this example one coaching a user of system 30 through the last step in the preparation of a dish such as the roasted bird discussed below. Once this clip ends, a graphic display 156 with the list of ingredients needed for the preparation of the dish automatically appears on screen 38. In other applications of the present invention, display 156 may be a parts list, a list of the tools needed to complete a user-selected task, etc.

As one alternative, the data storage device may also be encoded such that the menu from which a dynamic display is selected will be automatically returned to screen 38 once the presentation of the display is completed. Another useful option is to encode data storage device 31 so that video displays of the character described in the preceding paragraph will be replayed while the menu from which a choice is made will be restored to screen 38 when other of the available dynamic displays are selected.

Navigation charts 157 (FIG. 7) and 158 (FIG. 8) differ from navigation charts 122 and 155, respectively, in only one significant particular. This is that the pressing of remote control RESTART button 142 returns the system user to top level menu 146 rather than to introductory video 128. This is a feature of convenience for system users who have already viewed and are familiar with the introductory video. The system user can return to the first display of interest— i.e., the top level menu—without having to reach that menu from the introductory video with FWD button 144.

The introductory video-menu-information data storage layout 160 of FIGS. 9A and 9B for a kitchen use-oriented video compact disc 31 with task oriented coaching is representative. That layout has an introductory video 162, a four-level menu hierarchy 164 with a top level 166, a second level 168, a third level 169, and a fourth or bottom level 170. This layout also makes available among other displays of information four video clips 172 . . . 178 designed to coach a system user through the four self-contained steps of a single task—roasting poultry—and a static, graphics-text display 180 which lists the ingredients required for that task.

In employing the illustrated, representative system 30 and a video compact disc 31 with a layout as shown in FIGS. 9A and 9B for the task just mentioned—i.e., to roast a bird—the user selects choice 2 from top level main menu 182 by pressing remote control keypad button ② initially, or after having watched introductory video 162. This brings up on screen 38 the second level menu 184 labeled TECHNIQUES. At that juncture, the system user presses button ② on remote control keypad 140. This brings up on screen 38 the third level menu 186 labeled POULTRY.

Using button ⑤ on remote control keypad 140, the system user then selects from the third level menu 186 the fourth or bottom level menu 188 labeled ROASTING. This menu makes available the four video demonstrations 172, 174, 176, and 178 which respectively coach the system user through the four steps of roasting a bird—seasoning, trussing, and cooking the bird and, finally, preparing pan gravy. Any or all of these coaching demonstrations can be selected by the user with the remote control keypad buttons ① . . . ⑨ and BACK button 154. For example, the user may elect to see the demonstration on seasoning a bird by pressing button ① once menu 188 is reached, return to that menu at the end of the video by pressing BACK button 154, and then view the video clip on making pan gravy by pressing keypad button ④ or jump directly to the list of ingredients needed to roast the bird by pressing keypad button ⑤. Or, as another example, the user may elect to view the video on making pan gravy after having watched any of the other available demonstrations. In that case, the ingredients list 180 will automatically come up on screen 38 after the video on making pan gravy has ended.

It will be appreciated, in accord with the foregoing, that there are numerous other ways in which the system user can elect to be coached through the task of roasting a bird. Also, it is to be noted that FIGS. 9A and 9B depict only a fragment of layout 160. For example, none of the lower level menus appended to the second level menu 190 entitled STOCKING UP or the coaching information available by navigating downward from menu 190 are shown.

The invention may be embodied in many forms without departing from the spirit or essential characteristics of the invention. The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. A method of producing an encoded data storage device which includes the steps of:

identifying a task;

dividing said task into a set of logical, self-contained steps;

selecting a format for information utilizable to coach a user of an appliance equipped with said storage device in accomplishing at least one of said steps;

generating information for performing said step in the format selected for that step;

generating a hierarchical array of multiple choice menus with said hierarchical array being so constructed that there is a one-to-one correspondence between all menu choices and either: (a) next lower level menus, or (b) those task steps on which information is available; the choices available from the menus in said hierarchical menus being so encoded that any choice can be made by activating a single, numbered actuator of a numerical keypad incorporated in an appliance equipped with the laser readable disc;

generating for said task an instruction set which enables the user to navigate through said hierarchical array of menus and access the information for accomplishing any of those steps selected by the user on which information is available;

converting said information, said hierarchical array, and said instruction set to digital data; and permanently writing the digital data to said data storage device.

2. A method as defined in claim 1 in which said instruction set contains a user-retrievable command which enables a user to have the information on a particular step of said task repeated.

3. A method as defined in claim 1 in which said instruction set has user-retrievable commands which enable a user to navigate directly from a presentation of information on one step of said task to a presentation of information on a preceding or subsequent step.

4. A method as defined in claim 1 in which said instruction set has a user-retrievable command which enables a user to return directly from a presentation of information on a particular step of said task to a top level menu in a hierarcy of menus or to an introductory video.

5. A method as defined in claim 1 in which said instruction set has user-retrievable commands for switching the operation of an appliance equipped with said data storage device between a first, television watching mode of operation and a second, information retrieving and displaying mode of operation.

6. A method as defined in claim 5 in which the command for switching the operation of appliance from the first, television watching mode of operation to the second, information retrieving and displaying mode of operation returns the operation of the appliance to the point at which operation of the appliance in said second mode is interrupted by switching said appliance from operation in that mode to operation in the television receiving mode of operation.

7. A method as defined in claim 1 in which said instruction set comprises user-retrievable commands for navigating forwards and backwards through said hierarchical array of menus and for selecting choices from the said menus.

8. A method as defined in claim 1 in which said instruction set has a command for so operating an appliance equipped with the data storage device that a choice selected from a menu of said hierarchical array resulting in a presentation of information will remain active until a subsequent command is selected.

9. A method as defined in claim 1 in which the encoded data provides an asymmetrical multiple choice menu.

10. A method as defined in claim 1 in which the encoded data provides a video clip, a multiple choice menu from which the retrieval and display of said video clip can be selected, and an instruction set so coded that said menu is returned to the screen of an appliance equipped with the data storage device when the display of said video is completed.

11. A method as defined in claim 1 in which the encoded data provides a video clip and an instruction set so coded that said clip is repeatedly replayed until stopped by a user of an appliance equipped with the data storage device.

12. A method as defined in claim 1 in which the stored data provides a multiple choice menu and a dynamic display of information which may be selected from that menu, said data storage device also being so encoded that a display of said menu is returned to the screen of an appliance equipped with the data storage device when the dynamic display of information ends.

* * * * *